Nov. 19, 1957  L. POMPA  2,813,333
METHOD OF UNITING METALS AND PACK FOR SAME
Filed April 4, 1955
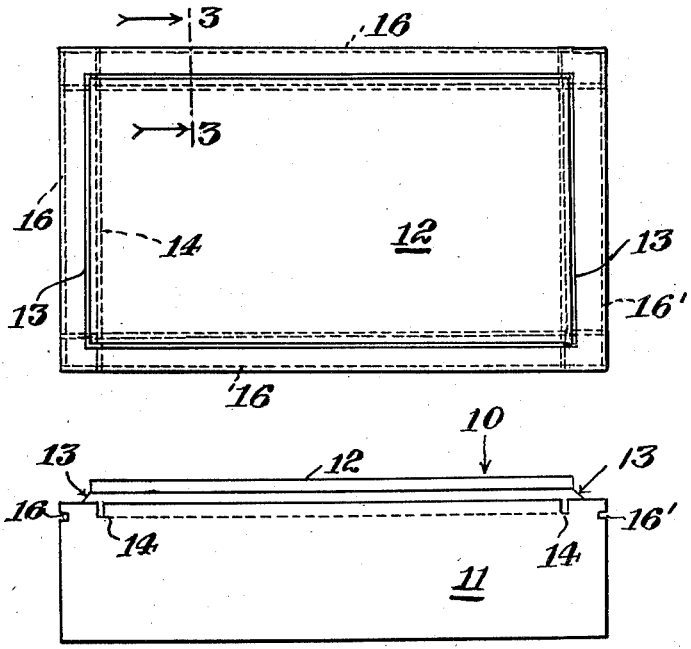
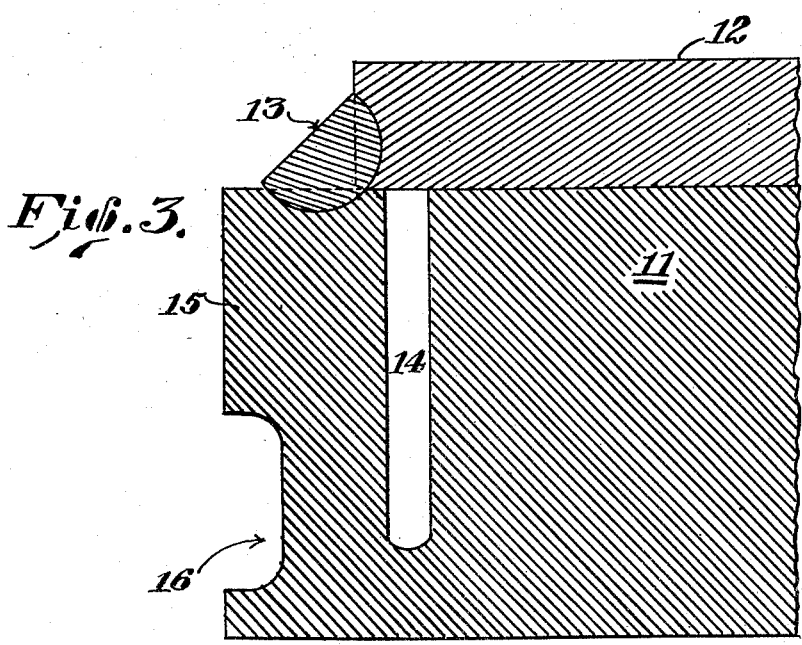
INVENTOR.
Leonard Pompa.
BY John R. Mason
Attorney.

United States Patent Office 2,813,333
Patented Nov. 19, 1957

2,813,333

METHOD OF UNITING METALS AND PACK FOR SAME

Leonard Pompa, Ardmore, Pa., assignor to Lukens Steel Company, Coatesville, Pa., a corporation of Pennsylvania Application April 4, 1955, Serial No. 498,801

6 Claims. (Cl. 29—471.5)

This invention relates to a method of uniting metals, and to a billet or pack for the same, wherein the metals are united by welding under pressure, and more particularly to a method of making clad metals.

An object of this invention is a method of producing a two-ply stainless clad steel.

Another object is to provide a method of preventing rupture of the edge weld by the tension set up during heating.

An additional object is to provide a method and means of uniting dissimilar metals and preventing rupture of edge welds due to differential expansion.

A further object is to provide a novel billet or pack for producing clad metals, such as two-ply stainless clad steel.

These and other objects will appear in the following description which, taken with the accompanying drawings, constitutes a complete disclosure of the invention.

In the drawings:

Figure 1 is a plan view of a pack as prepared for pressure welding;

Figure 2 is a side elevation of the pack shown in Figure 1; and

Figure 3 is a fragmentary vertical sectional view on an enlarged scale, taken on the line 3—3 of Figure 1.

Because of the difference in thermal expansion between dissimilar metals such as a carbon steel backing having a stainless steel insert, the operation of bonding the two dissimilar metals is very sensitive, and previous attempts using conventional techniques have often resulted in failures to produce acceptable material.

One of the principal causes preventing the required bond between the elements is the difference in length generated by the heat cycle. Since the two elements are welded together at the edges, at some point during the heating cycle a maximum force will be generated and this force must be resisted by the weld connections.

The thermal forces are of very high magnitude, and, as such, bring about immediate failure to the connecting welds between the elements.

I have found that if one of the elements, such as the backing material, is prepared prior to assembly in a manner so as to introduce flexibility at points where maximum restraint takes place, the interacting forces between the two elements will be reduced to a minimum. In this manner, difficulties arising from thermal expansion may be eliminated, thus making possible the production of a useable product.

In one form of the invention, a groove is machined in the backing steel slab, as shown in the attached drawings, and the stainless insert is welded to the backing plate outside of the aforementioned groove. When the thermal differentials are generated during the welding operation, the two equal and opposite reactive forces will be resisted by the insert and the material outside of the groove. Since the material outside the groove is kept to a small value, its behavior will be similar to that of a cantilever beam, thus permitting outward motion without generating high stresses of uncontrollable magnitude.

By way of example, the numeral 10 represents a pack prepared for the heating and pressure welding steps. At 11 is shown a thick base, bar or the like, hereinafter referred to as a base plate, composed of carbon steel, and 12 indicates a sheet of cladding, such as a sheet of alloy steel commonly referred to as stainless steel. Sheet 12 is welded around all four edges to the slab by means of weld seam 13.

Trouble has heretofore been encountered in endeavoring to heat such a pack, in that the differential expansion of the two metal plates creates sufficient tension at the weld 13 to cause rupture at this point.

The present invention overcomes this difficulty in the following manner. All around the upper surface of the base plate a narrow groove 14 is cut parallel to each edge and adjacent to each edge, such as about one inch in from each edge of said base plate. Sheet 12 is then cut smaller than the base plate 11, but is large enough to bridge the groove at all points and is welded to plate 11 outside the groove as at 13. Experience has shown that with a base plate nine inches thick and a cladding sheet one inch thick, a groove of about three-eighths of an inch wide and about three inches deep, substantially one inch in from the edge of the base plate, is sufficient to compensate for the differential expansion of the two metals. Further to increase the yield of portion 15 beyond groove 14, shallow grooves 16, 16' may be cut along all four of the longitudinal edges of base plate 11. These grooves may be about three-eighths of an inch to one-half inch in depth and about one and one-half inches wide, in the case of the example just furnished. The grooves 16, 16' should be approximately centered with relation to the bottom of groove 14.

In preparing my pack for pressure rolling and welding, groove 14 is machined all around the plate 11 and, if used, grooves 16, 16' are cut along the four longitudinal edges of said plate. Plates 11 and 12 are then cleaned and fluxed in the usual manner, and are placed one on the other in the position illustrated in the figures. Sheet 12 is then welded along all four of its edges to plate 11, as indicated at 13.

In a specific example, a pack one hundred by sixty inches is prepared in the manner stated above, comprising a base plate nine inches thick and a cladding sheet one inch thick welded to the base plate at the edges, as set forth hereinbefore. During the heating of the pack, the portion 15 yields where it is thinned by grooves 14 and 16. This results in no undue strain being placed on weld 13, despite the different coefficients of expansion of the metals used.

It may be useful to consider the following formulae from which one may determine the depth of the groove and the size of the edge weld:

I.  $$X = \frac{L/2 \times \Delta T \times (\alpha_c - \alpha_s)}{\left[\frac{l^3}{3E_s I_b} + \frac{L/2}{t E_c}\right]} \text{ p. l. i.}$$

II.  $$fc = \frac{X}{t} \text{ p. s. i.}$$

III.  $$fs = \frac{Xl}{b^2/6} \text{ p. s. i.}$$

IV.  $$h = \frac{X}{fc \frac{\sqrt{2}}{2}} = \frac{\sqrt{2} X}{fc} \text{ in.}$$

wherein:

X equals interacting force in pounds per linear inch of slab;
$fc$ equals unit stress in cladding sheet;
$fs$ equals unit stress in base plate;
$\Delta T$ equals temperature change (degrees F.);
$\alpha_c$ equals coefficient of expansion of cladding metal;
$\alpha_s$ equals coefficient of expansion of base plate;
$E_c$ equals Young's modulus of cladding sheet;
$E_s$ equals Young's modulus of base plate;
L equals longest dimension of cladding sheet in inches;
$l$ equals depth of groove in base plate in inches;
$b$ equals thickness of edge metal in inches;
$t$ equals thickness of stainless cladding sheet in inches;
$h$ equals size of weld fillet in inches.

The pack prepared as above described is ready for the usual heating and rolling steps for the production of a stainless clad steel sheet.

The term alloy steel sheet in the claims includes a sheet of stainless steel and other alloy steels having stainless steel qualities.

Various modifications may be resorted to in practicing this invention. For instance, other metals may be substituted for those described herein. Moreover, I do not desire to be limited to the number or location of the grooves except as set forth in the appended claims.

I claim:

1. A method of producing clad steel sheets which comprises forming a groove on the upper face thereof adjacent each edge of a carbon steel base plate, cutting a groove in each side edge of said base plate, placing a sheet of alloy steel smaller than the base plate on top of said base plate with the edges of the alloy steel sheet extending over and being substantially parallel with the said first named grooves on the base plate, said alloy steel sheet being of a substantially different coefficient of expansion than said carbon steel base plate, said grooves in said base plate providing yieldable portions to thereby compensate for the difference in the thermal expansion of the metal base plate and steel alloy sheet, welding the edges of the alloy steel sheet to the base plate, and heating and rolling the pack.

2. A pack for producing clad metal having dissimilar thermal expansion properties, a carbon steel base plate, having a narrow groove in its upper face inwardly from each edge and adjacent thereto, a cladding sheet of alloy steel extending to the outer edge of the groove at all points whereby said groove compensates for the difference in thermal expansion of the metal base plate and steel alloy sheet during the heating and rolling thereof of said pack, a fillet of welding metal joining said sheet to said plate on all sides thereof.

3. A pack as in claim 2, wherein a second groove is provided along each longitudinal edge of the base plate.

4. The pack as in claim 3, wherein the last mentioned groove is approximately centered with the bottom of the first mentioned groove.

5. A method of preparing a pack which comprises forming grooves on the upper face of a carbon steel base plate adjacent the side edges of said base plate, placing a sheet of alloy steel smaller than the base plate on top of the base plate with the edges of the alloy steel sheet extending over and being substantially parallel with said grooves on the base plate, said alloy steel sheet being of a substantially different coefficient of expansion than said carbon steel base plate, said grooves of said base plate providing yieldable portions to thereby compensate for the difference in thermal expansion of said base plate and steel alloy sheet, welding the edges of the cladding sheet to the base plate, and heating and rolling the pack.

6. A method of preparing a pack which comprises cutting grooves on the upper face of a carbon steel base plate adjacent the edges of said base plate, placing a sheet of alloy steel smaller than the base plate on top of the base plate with the edges of the alloy steel sheet extending over and being substantially parallel with said grooves on the base plate, said alloy steel sheet being of a substantially different coefficient of expansion than said carbon steel base plate, said grooves of said base plate providing yieldable portions to thereby compensate for the difference in thermal expansion of said base plate and steel alloy sheet, welding the edges of the cladding sheet to the base plate, and heating and rolling the pack.

References Cited in the file of this patent

UNITED STATES PATENTS

| | | |
|---|---|---|
| 2,423,811 | Goulding | July 8, 1947 |
| 2,718,690 | Ulam | Sept. 27, 1955 |